United States Patent
Lee et al.

(10) Patent No.: US 12,050,919 B2
(45) Date of Patent: Jul. 30, 2024

(54) METHOD AND DEVICE FOR EFFICIENTLY PROVIDING PROFILE FOR COMMUNICATION SERVICE BASED ON MULTIPLE BOOTSTRAP PROFILES

(71) Applicant: Samsung Electronics Co., Ltd., Suwon-si (KR)

(72) Inventors: Duckey Lee, Suwon-si (KR); Jonghan Park, Suwon-si (KR); Hyewon Lee, Suwon-si (KR); Sujung Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 17/765,821

(22) PCT Filed: Sep. 29, 2020

(86) PCT No.: PCT/KR2020/013417
§ 371 (c)(1),
(2) Date: Mar. 31, 2022

(87) PCT Pub. No.: WO2021/066572
PCT Pub. Date: Apr. 8, 2021

(65) Prior Publication Data
US 2022/0326959 A1 Oct. 13, 2022

(30) Foreign Application Priority Data
Oct. 2, 2019 (KR) .................. 10-2019-0122309

(51) Int. Cl.
G06F 9/44 (2018.01)
G06F 9/4401 (2018.01)
H04L 9/40 (2022.01)
H04L 67/00 (2022.01)

(52) U.S. Cl.
CPC ........ *G06F 9/4401* (2013.01); *H04L 63/0869* (2013.01); *H04L 67/34* (2013.01)

(58) Field of Classification Search
None
See application file for complete search history.

(56) References Cited

U.S. PATENT DOCUMENTS 9,264,844 B2 2/2016 Park et al.
9,635,487 B2 4/2017 Rodgers et al.
(Continued)

FOREIGN PATENT DOCUMENTS

KR 10-2013-0132291 A 12/2013
KR 10-2015-0122018 A 10/2015
(Continued)

OTHER PUBLICATIONS

International Search Report and Written Opinion of the International Searching Authority dated Dec. 21, 2020, in connection with International Application No. PCT/KR2020/013417, 12 pages.

*Primary Examiner* — Danny Chan

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method by which a terminal receives a profile for a communication service in a wireless communication system according to an embodiment of the present invention comprises the steps of: receiving, from a query server by the terminal, first download information for receiving a second bootstrap profile by using a first bootstrap profile, which is (Continued)

one of a plurality of bootstrap profiles installed in the terminal; downloading the second bootstrap profile from a first profile server by using the first download information and installing the second bootstrap profile in the terminal; and installing a user profile in the terminal on the basis of the second bootstrap profile and user selection, and accessing a mobile network by using the user profile.

13 Claims, 9 Drawing Sheets

(56) References Cited

U.S. PATENT DOCUMENTS

| | | | |
|---|---|---|---|
| 9,923,724 B2 | 3/2018 | Lee et al. | |
| 10,075,205 B2 | 9/2018 | Lee et al. | |
| 2015/0349825 A1* | 12/2015 | Lee | H04L 63/0853 |
| | | | 455/558 |
| 2017/0034699 A1* | 2/2017 | Michel | H04W 12/069 |
| 2019/0281442 A1* | 9/2019 | Kim | H04W 8/183 |
| 2020/0128390 A1* | 4/2020 | Lee | H04W 12/35 |
| 2020/0186992 A1 | 6/2020 | Bas Sanchez et al. | |
| 2020/0228969 A1* | 7/2020 | Shin | H04W 12/06 |
| 2022/0225083 A1* | 7/2022 | Borisoglebski | H04W 8/183 |

FOREIGN PATENT DOCUMENTS

| | | |
|---|---|---|
| KR | 10-1634473 B1 | 6/2016 |
| KR | 10-2014108 B1 | 8/2019 |
| WO | 2014193181 A1 | 12/2014 |
| WO | 2019015793 A1 | 1/2019 |

* cited by examiner

METHOD AND DEVICE FOR EFFICIENTLY PROVIDING PROFILE FOR COMMUNICATION SERVICE BASED ON MULTIPLE BOOTSTRAP PROFILES

CROSS-REFERENCE TO RELATED APPLICATIONS

This application is a 371 National Stage of International Application No. PCT/KR2020/013417, filed Sep. 29, 2020, which claims priority to Korean Patent Application No. 10-2019-0122309, filed Oct. 2, 2019, the disclosures of which are herein incorporated by reference in their entirety.

BACKGROUND

1. Field

The disclosure relates to a wireless communication system and particularly to a method and apparatus for downloading and installing access information for accessing a communication system. More particularly, the disclosure relates to a method and apparatus for providing bootstrap communication necessary for downloading access information for accessing a communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a Beyond 4G Network or a Post LTE System. The 5G communication system is considered to be implemented in higher frequency (mm-Wave) bands (e.g., 60 GHz bands) so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as sensing technology, wired/wireless communication and network infrastructure, service interface technology, and security technology, have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine to machine (M2M) communication, and machine type communication (MTC) may be implemented by beamforming, MIMO, and array antennas. Application of a cloud radio access network (RAN) as the above-described Big Data processing technology may also be considered to be as an example of convergence between the 5G technology and the IoT technology.

A universal integrated circuit card (UICC) is a smart card inserted into a mobile communication terminal and is also called a UICC card. The UICC may contain an access control module for accessing a network of a mobile communication operator. A universal subscriber identity module (USIM), a subscriber identity module (SIM), and an IP multimedia service identity module (ISIM) are examples of the access control module. A UICC containing the USIM is usually referred to as a USIM card. Similarly, a UICC containing the SIM is usually referred to as a SIM card. In the following description of the disclosure, the term "SIM card" will be used in a general sense including the UICC card, the USIM card, the UICC containing the ISIM, and the like. That is, even though it is referred to as the SIM card, its technical contents may be equally applied to the USIM card, the ISIM card, or the general UICC card.

The SIM card stores personal information of a mobile communication subscriber and, when accessing a mobile communication network, performs subscriber authentication and traffic security key generation, thereby enabling safe use of mobile communication.

Generally, the SIM card is manufactured as a dedicated card for a specific mobile communication operator at the request of the operator and released after authentication information for access to a network of the operator, for example, a universal subscriber identity module (USIM) application, international mobile subscriber identity (IMSI), K value, OPc value, etc., is loaded in the card in advance. The manufactured SIM card is delivered to the mobile communication operator and provided to the subscriber, and then, if necessary, management such as installation, modification, and deletion of applications in the UICC may be performed by using technologies such as over-the-air (OTA). The subscriber can use the network and application services of the corresponding mobile communication operator by inserting the UICC card into the owned mobile communication terminal. Also, by moving the UICC card from an old terminal to a new terminal when replacing the terminal, the subscriber can use in the new terminal the authentication information, a mobile communication phone number, a personal phone book, etc. which are stored in the UICC card.

However, the SIM card is inconvenient when a mobile communication terminal user desires to use services of other mobile communication operators. That is, the mobile communication terminal user suffers inconvenience of having to physically acquire the SIM card in order to use a service of a mobile communication operator. For example, when traveling to another country, it is inconvenient to obtain a local SIM card in order to use a local mobile communication service. Although the roaming service solves the above inconvenience to some extent, in general, there are problems such as high rates, slow communication speed, and the inability to use the service if there is no contract between mobile communication operators.

Meanwhile, when the SIM module is installed in the UICC card through remote download, the above-mentioned inconvenience can be largely solved. That is, the user can download, in the UICC card at a desired time, the SIM module of the mobile communication service to be used. Also, it is possible to download and install a plurality of SIM modules and select only one SIM module among them to use in the UICC card. This UICC card may or may not be fixed to the terminal.

The UICC card maintains international compatibility by defining its physical shape and logical function in a standardization organization called European Telecommunications Standards Institute (ETSI). In the aspect of a form factor that defines the physical shape, the size is getting smaller and smaller, from the most widely used mini-SIM to micro-SIM and, more recently, to nano-SIM. Although this contributes a lot to the miniaturization of mobile communication terminals, it is expected that the UICC card, which is smaller than the recently enacted nano SIM, will be difficult to be standardized due to concerns about loss by users. Also, because the detachable UICC card requires a space of an insertion slot in the terminal due to its characteristics, further miniaturization is expected to be difficult.

In order to solve this problem, a requirement for replacing the UICC by embedding a security module performing a function similar to the UICC in the mobile communication terminal when manufacturing the terminal has emerged. To meet this requirement, an embedded Universal Integrated Circuit Card (eUICC) structure, which is a non-detachable UICC, has been proposed.

Such a UICC fixed to the terminal is called an embedded UICC (eUICC). In general, the eUICC refers to a UICC card that is used in the form of being fixed to the terminal and can select a SIM module downloaded from a profile server remotely. In the disclosure, UICC cards capable of remotely downloading and selecting the SIM module are collectively referred to as the eUICC. That is, among UICC cards that can remotely download and select the SIM module, a UICC card fixed to the terminal and a UICC card not fixed to the terminal are collectively referred to as the eUICC. Also, information of the downloaded SIM module will be collectively referred to as the term eUICC profile or SIM profile. In addition, in the disclosure, an eUICC terminal will be used in the sense of a terminal that can remotely download and install the SIM profile in conjunction with the embedded UICC or the detachable UICC.

Upon enabling the SIM profile after downloading and installing the SIM profile, the eUICC terminal can access a mobile communication network corresponding to the SIM profile by using an application and credentials of the SIM profile. Such a mobile communication network may be a mobile network that directly corresponds to the SIM profile. However, it may be another scheme such as roaming in which the mobile network belongs to another communication operator whereas authentication of network access is performed in a system of the operator corresponding to the SIM profile. In the disclosure, for convenience, the operator corresponding to the SIM profile will be referred to as a home operator, and a mobile operator that provides roaming in consultation with the home operator will be referred to as a roaming operator. When there is such an access attempt, the mobile communication network operator may authenticate the validity or not of the SIM profile file by using subscriber information (e.g., IMSI) and credentials both corresponding to the SIM profile. In addition, it may check whether there is a network access authority for such subscriber information (i.e., IMSI) and thereby allow or deny the access or limitedly allow the access.

In order to download the SIM profile to the eUICC terminal, a communication function to the SIM profile server (or SM-DP+ server) should be provided in the eUICC terminal. For example, the eUICC terminal can download the SIM profile by using WiFi access in an environment that the WiFi access is provided. However, there is an inconvenience that the SIM profile cannot be downloaded if there is no WiFi environment or if there is no access credentials required for the WiFi access.

Meanwhile, in order to solve this inconvenience in downloading the SIM profile through WiFi, a bootstrap SIM profile may be used. The bootstrap SIM profile may also be referred to as a provisioning profile or a provisioning SIM profile. The bootstrap SIM profile may be pre-loaded in the terminal according to a separate contract with the mobile communication operator and provide a communication function necessary for downloading the eUICC profile to be installed later. This bootstrap SIM profile is controlled through the function of the terminal or the network of the mobile operator to be used only for the purpose necessary to download and install the SIM profile. Typically, this control can be performed with a white list of accessible server addresses.

The bootstrap SIM profile is loaded in the eUICC terminal, and a phone number and IMSI resource are allocated for each bootstrap SIM profile. This may result in an increase in terminal cost.

On the other hand, if the bootstrap SIM profile provided by a specific mobile operator operates through a local access in a specific area and operates through roaming access in other areas, a bootstrap profile provider such as a terminal manufacturer may incur expensive roaming data costs. In particular, when the bootstrap SIM profile is not only used to download the SIM profile, but also introduces various communication services to the user on the terminal screen, offers a rate plan, and provides a subscription process that supports a payment process, a large amount of data may be consumed. Providing such data to the bootstrap SIM profile may be burdensome.

In addition, the bootstrap SIM profile is loaded in the terminal prior to the sale of the terminal. By the way, in case of trying to access the SIM profile server (or SM-DP+) that is missing from the list of accessible server addresses in mobile access using the bootstrap SIM profile, there is an inconvenience of not being able to access. For this reason, it may be difficult to use the bootstrap SIM profile in a situation that a specific country or service situation changes after the terminal is manufactured.

SUMMARY

A technical problem to be achieved by the disclosure is a scheme for effectively downloading a SIM profile of an eUICC terminal in a bootstrap profile use environment in which a communication environment of terminals is limited in a communication system.

According to an embodiment of the disclosure, a method for receiving a profile for a communication service at a terminal in a wireless communication system may include receiving, at the terminal from a query server, first download information for receiving a second bootstrap profile by using a first bootstrap profile which is one of a plurality of bootstrap profiles installed in the terminal; downloading the second bootstrap profile from a first profile server by using the first download information and installing the second bootstrap profile in the terminal; and installing a user profile in the terminal, based on the second bootstrap profile and a user selection, and accessing a mobile network by using the user profile.

The method for receiving the profile at the terminal may further include accessing a purchase server by executing the second bootstrap profile, determining the user profile, based on information about a communication service provided by the purchase server, receiving second download information for receiving the user profile from the purchase server, and downloading the user profile from a second profile server by using the second download information and installing the user profile in the terminal.

The method for receiving the profile at the terminal may further include disabling and deleting the second bootstrap profile after installing the user profile, enabling the user profile, and transmitting information indicating deletion of the second bootstrap profile.

The method for receiving the profile at the terminal may further include, when a predetermined time elapses after the second bootstrap profile is enabled, disabling and deleting the second bootstrap profile, enabling the first bootstrap profile, transmitting information indicating deletion of the second bootstrap profile, and disabling the first bootstrap profile.

The method for receiving the profile at the terminal may further include executing the first bootstrap profile, based on a user selection for rate plan information displayed in the terminal, or executing the first bootstrap profile by scanning a quick response (QR) code.

The method for receiving the profile at the terminal may further include transmitting location information of the terminal to the query server, and the first download information may be determined, based on the location information.

The method for receiving the profile at the terminal may further include performing mutual authentication with the first profile server, based on authentication information included in the first download information.

Access information to the purchase server may be previously set in the terminal, included in the first download information, or included in metadata information of the installed second bootstrap profile.

The method for receiving the profile at the terminal may further include accessing the second profile server, based on address information included in the second download information, and performing mutual authentication with the second profile server, According to an embodiment of the disclosure, a terminal for receiving a profile for a communication service in a wireless communication system may include a transceiver and a controller connected to and controlling the transceiver. The controller may be configured to receive, from a query server, first download information for receiving a second bootstrap profile by using a first bootstrap profile which is one of a plurality of bootstrap profiles installed in the terminal, to download the second bootstrap profile from a first profile server by using the first download information and install the second bootstrap profile in the terminal, to install a user profile in the terminal, based on the second bootstrap profile and a user selection, and to access a mobile network by using the user profile.

The technical problems to be achieved by the disclosure are not limited to the above-mentioned technical problem, and other technical problems not mentioned are clearly understood from the following description by those of ordinary skill in the art to which the disclosure belongs.

According to an embodiment of the disclosure, provided is a method for a terminal equipped with eUICC in a communication system to purchase and download an SIM profile even if a bootstrap profile installed in the terminal fails to provide communication necessary for purchasing and downloading a new SIM profile in an environment without WiFi.

DETAILED DESCRIPTION

Figure 1:
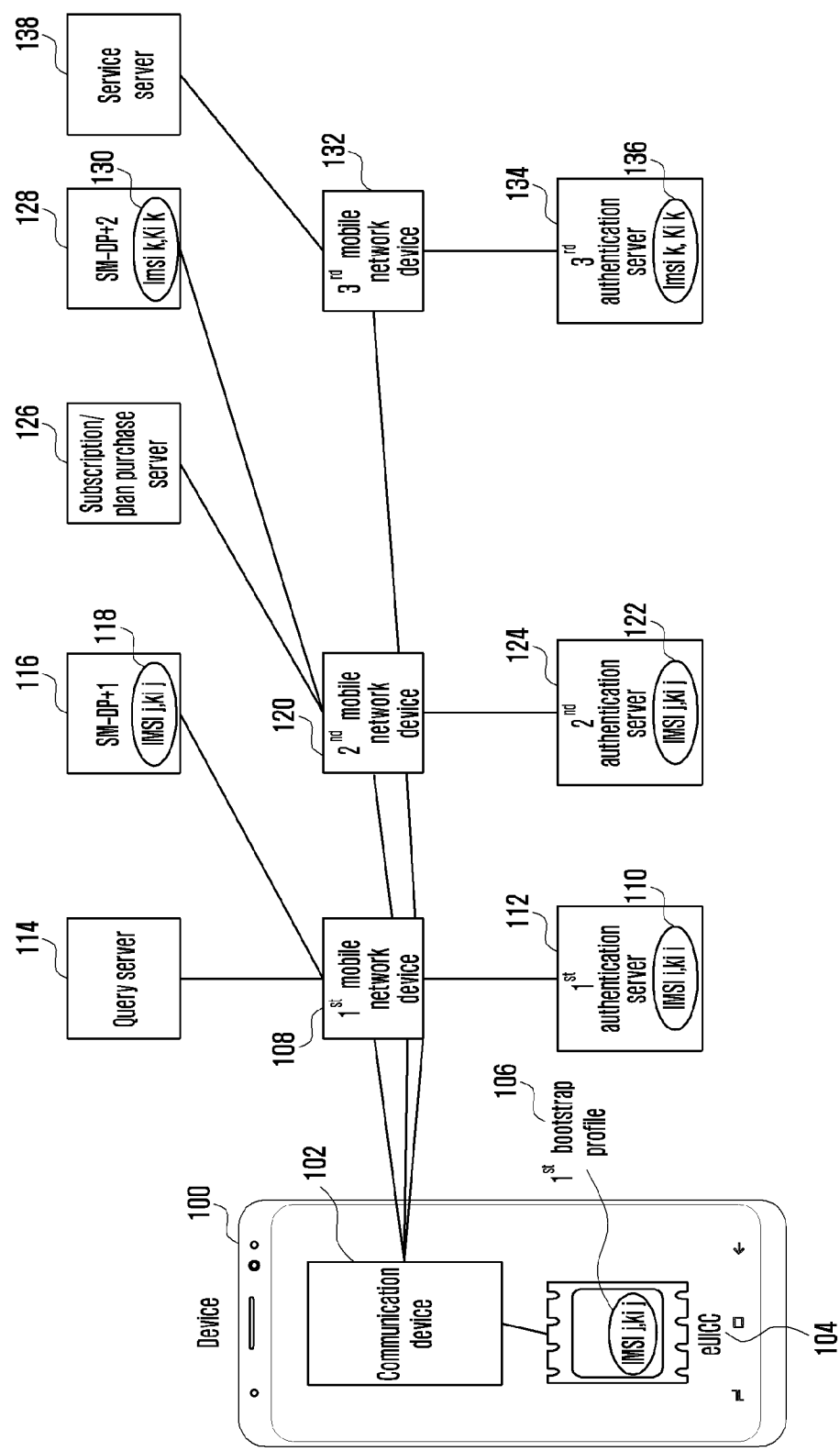
FIG. 1 is a diagram illustrating the configuration of a communication system to which an embodiment of the disclosure is applied.

Hereinafter, embodiments of the disclosure will be described in detail with reference to the accompanying drawings. In the accompanying drawings, the same elements are denoted by the same reference numerals as much as possible. In addition, detailed descriptions of well-known functions and configurations that may obscure the gist of the disclosure will be omitted.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card.

First, the terms used herein are defined.

In the disclosure, a UICC is a smart card inserted into a mobile communication terminal and refers to a chip that stores personal information such as network access authentication information, phone book, and SMS of a mobile communication subscriber and performs, upon accessing a mobile communication network such as GSM, WCDMA, LTE, etc., enables a safe use of mobile communication by performing subscriber authentication and traffic security key generation. The UICC may be equipped with communication applications such as a subscriber identification module (SIM), a universal SIM (USIM), and an IP multimedia SIM (ISIM) depending on the type of mobile communication network accessed by the subscriber, and may provide a high-level security function for equipping various applications such as electronic wallet, ticketing, and e-passport.

In the disclosure, an embedded UICC (eUICC) is a security module in the form of a chip being embedded in the terminal, not a detachable type that allows insertion into and removal from the terminal. The eUICC can download and install a profile by using remote SIM provisioning technology. The eUICC can be named as a UICC that can download and install a profile.

In the disclosure, a method of remotely downloading and installing a profile in the eUICC may also be applied to a detachable UICC that can be inserted into and removed from the terminal. That is, an embodiment of the disclosure may be applied to the UICC that can download and install a profile by using the RSP technology.

In the disclosure, the term UICC may be used interchangeably with SIM, and the term eUICC may be used interchangeably with eSIM.

In the disclosure, a profile may mean that an application, a file system, an authentication key value, etc. stored in the UICC are packaged in a software form.

In the disclosure, a USIM profile may have the same meaning as the profile or may mean that information included in a USIM application within the profile is packaged in a software form.

In the disclosure, a profile server may generate the profile, encrypt the generated profile, perform mutual authentication with the terminal, and download the encrypted profile to the terminal. The profile server may be expressed as SM-DP+ (Subscription Manager Data Preparation plus).

The term 'terminal' or 'device' used herein may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a local profile assistant (LPA), an application, a device software (device SW) mobile, or other terms.

Various embodiments of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback appliance having a wireless communication function, an Internet home appliance capable of wireless Internet access and browsing, and portable units or terminals incorporating combinations of such functions. In addition, the terminal may include, but is not limited to, a machine to machine (M2M) terminal and a machine type communication (MTC) terminal/device.

In the disclosure, the terminal may also be referred to as an electronic device or simply a device. In the disclosure, the terminal or device may be equipped with one or more UICC insertion slots or eUICCs. For example, the terminal may be equipped with one or more eUICCs. In another example, the terminal may be equipped with one UICC insertion slot and one or more eUICCs. In still another example, the terminal may be equipped with two UICC insertion slots and one or more eUICCs.

In the disclosure, the terminal or device may include software or application installed therein to control the UICC or eUICC. This software or application may be referred to as, for example, a local profile assistant (LPA), may include a function of the LPA, or may be software for processing a task in conjunction with the LPA.

In the disclosure, an eUICC identifier (eUICC ID) may be a unique identifier of the eUICC embedded in the terminal and may be referred to as an EID.

In the disclosure, an application protocol data unit (APDU) may be a message for a controller in the terminal or device to interwork with the eUICC.

In the disclosure, a profile package may be used interchangeably with the profile or used as a term representing a data object of a specific profile, and may be named as a profile TLV or a profile package TLV. In case that the profile package is encrypted using an encryption parameter, it may be named as a protected profile package (PPP) or a protected profile package TLV (PPP TLV). In case that the profile package is encrypted using an encryption parameter that can be decrypted only by a specific eUICC, it may be named as a bound profile package (BPP) or a bound profile package TLV (BPP TLV). The profile package TLV may be a data set that expresses information constituting the profile in the format of tag, length, and value (TLV). When the profile package is installed in a specific eUICC and the corresponding profile is enabled, it is possible to access a mobile network corresponding to the profile by using one or more network access applications (NAAs) and perform access authentication such as AKA authentication.

In the disclosure, AKA may indicate authentication and key agreement and indicate an authentication algorithm for accessing 3GPP and 3GPP2 networks.

In the disclosure, K is an encryption key value stored in the eUICC used for the AKA authentication algorithm.

In the disclosure, OPc is a parameter value that can be stored in the eUICC used for the AKA authentication algorithm.

In the disclosure, NAA is a network access application program and may be an application program such as the USIM or the ISIM stored in the UICC to access a network. The NAA may be a network access module.

In the description of the disclosure, when it is determined that a detailed description of a related known function or configuration may unnecessarily obscure the gist of the disclosure, the detailed description thereof will be omitted.

Hereinafter, a proposed embodiment will be described with reference to the drawings.

FIG. 1 is a diagram illustrating the configuration of a communication system to which an embodiment of the disclosure is applied.

With reference to FIG. 1, a communication system to which an embodiment of the disclosure is applied includes a device 100, a first mobile network device 108, a first authentication server 112, a query server 114, a first SM-DP+ server 118, a second mobile network device 120, a second authentication server 124, a subscription/plan purchase server 126, a second SM-DP+ server 128, a third mobile network device 132, a third authentication server 134, and a service server 138.

The device is capable of being equipped with or mounting an eUICC 104 and includes a communication device 102 that is connected to the eUICC and provides a communication network access function. The eUICC has a first bootstrap profile 106. Using the first bootstrap profile of the eUICC, the device may establish a wireless connection to the first mobile network device 108 and request access to the first mobile network device through the first authentication server 112 connected to the first mobile network device. The first authentication server may store authentication information of the first bootstrap profile.

For example, the first authentication server has IMSIi and Kii values stored in the first bootstrap profile, so that it can perform mutual authentication such as AKA authentication with the device. Through this, the first authentication server may allow the device to access the first mobile network device. The device may access the query server 114 and the first SM-DP+ 116 via the first mobile network device. The device may request the query server 114 and thereby receive information for downloading a first profile required to download a second bootstrap profile. The information for first profile download may include at least one of an activation code, a matchingId, an event, an activation code token, and a profile server address.

Using the information for first profile download, the device may download and install the second bootstrap profile from the first SM-DP+. Using the second bootstrap profile, the device may establish a wireless connection to the second mobile network device 120 and request access to the second mobile network device through the second authentication server 122 connected to the second mobile network device. The second authentication server may store authentication information of the second bootstrap profile. For example, the second authentication server has IMSIi and Kii values stored in the second bootstrap profile, so that it can perform mutual authentication such as AKA authentication with the device. Through this, the second authentication server may allow the device to access the second mobile network device.

The device may access the subscription/plan purchase server 126 and the second SM-DP+ 128 via the second mobile network device. Accessing the subscription/plan purchase server, the device may select and purchase or subscribe to a profile or plan and, as a result, receive information for downloading a second profile required to download a user SIM profile. The information for second profile download may include at least one of an activation code, a matchingId, an event, an activation code token, and a profile server address. Using the information for second profile download, the device may download and install the user SIM profile from the second SM-DP+. Using the user SIM profile, the device may establish a wireless connection to the third mobile network device 132 and request access to the third mobile network device through the third authentication server 134 connected to the third mobile network device. The third authentication server may store authentication information of the user SIM profile. For example, the third authentication server has IMSIi and Kii values stored in the user SIM profile, so that it can perform mutual authentication such as AKA authentication with the device. Through this, the third authentication server may allow the device to access the third mobile network device. The device may access the service server 138 through the third mobile network device. The service server is a server that can be accessed according to a rate plan purchased or subscribed by the user. For example, in case of a rate plan allowing general Internet access, it may be any service server connected to the Internet.

Figure 2:
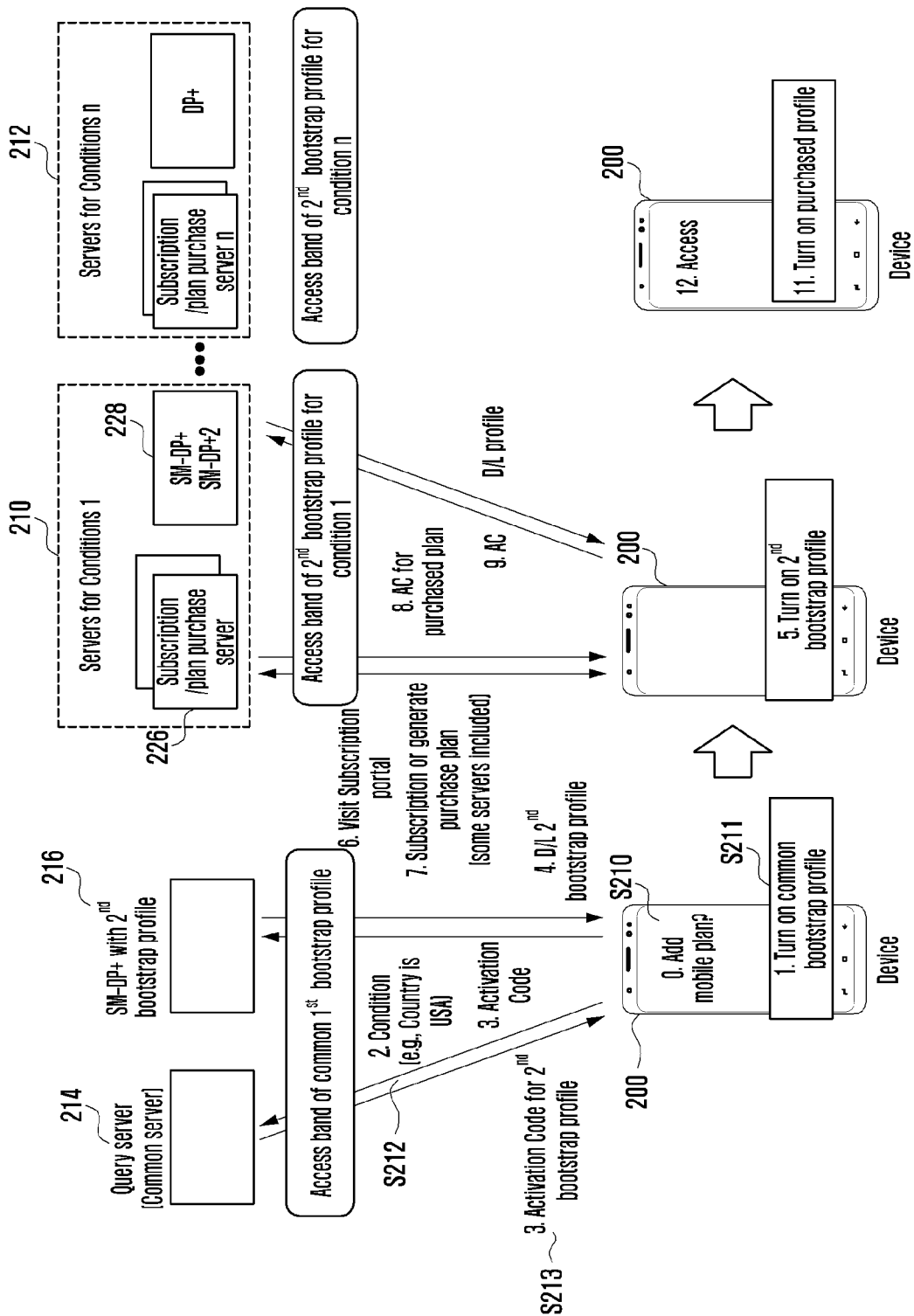
FIG. 2 is a diagram illustrating the operation of a communication system to which an embodiment of the disclosure is applied.

FIG. 2 is a diagram illustrating the operation of a communication system to which an embodiment of the disclosure is applied.

With reference to FIG. 2, a menu for adding a new mobile rate plan may be displayed on a screen of the device 200 (S210). The menu for adding the new mobile rate plan may be displayed as any other text. For example, a menu to add a new eSIM profile may be displayed.

When the user selects the above menu, the device 200 may turn on a first bootstrap profile installed in the device 200 (S211). To turn on a profile may be an operation of enabling the profile.

When the first bootstrap profile is turned on and the device 200 accesses the corresponding mobile network, the device may transmit condition information of the device 200 to a query server 214 (S212). For example, location information of the device 200 may be transmitted.

Upon receiving the condition information from the device 200, the query server 214 may select a first activation code stored therein by referring to the condition information and provide it to the device (S213). At this time, the first activation code is information corresponding to a second bootstrap SIM profile, and the query server 214 selects the first activation code for downloading the second bootstrap SIM profile that is not currently installed in another device, and provides it to the device 200.

After receiving the first activation code, the device 200 performs mutual authentication with a first SM-DP+ 216 by using first SM-DP+ information included in the first activation code, and transmits an AC_token value included in the first activation code to the first SM-DP+ 216 (S213). Then the device downloads a second bootstrap profile from the first SM-DP+ 216 and installs it (S214).

Thereafter, the device 200 may turn on the second bootstrap profile (215). To turn on the profile may include a process of turning off the previously turned on profile. An operation of turning off the profile may be an operation of disabling the profile.

When the second bootstrap profile is turned on, the device 200 may access a subscription/plan purchase server 226 (S216). A server address used for the access may be information preset in the terminal, may be transmitted from the query server 214 together with the first activation code at the step S213, or may be included in profile metadata information of the profile installed at the step S214.

Upon accessing the subscription/plan purchase server 226, the device 200 may display information about a communication service, such as subscription information or rate plan information, to the user and provide a menu for purchasing or subscribing to the service (S217). The provision may be a way of expressing, at the device 200, what the subscription/plan purchase server provides. When the user specifies a rate plan or a SIM profile at the step S217, the subscription/plan purchase server 226 may transmit second activation code information required to download a user SIM profile to the device 200 (S218).

When receiving the second activation code information, the device 200 accesses a second SM-DP+ 228 by using the server address included in the second activation code, performs mutual authentication, and transmits an AC_token value included in the second activation code to the second SM-DP+ 228 (219). Then the device may download a user SIM profile from the second SM-DP+ 228 and install it in the device 200 (S220).

After the user SIM profile is installed, the device 200 may turn on the user SIM profile (221). The operation of turning on the user SIM profile may be performed automatically by the device 200 or performed when there is an explicit consent or selection of the user.

Upon accessing the mobile network by using the enabled user profile, the device 200 may display that the access is made (S222).

Figure 3:
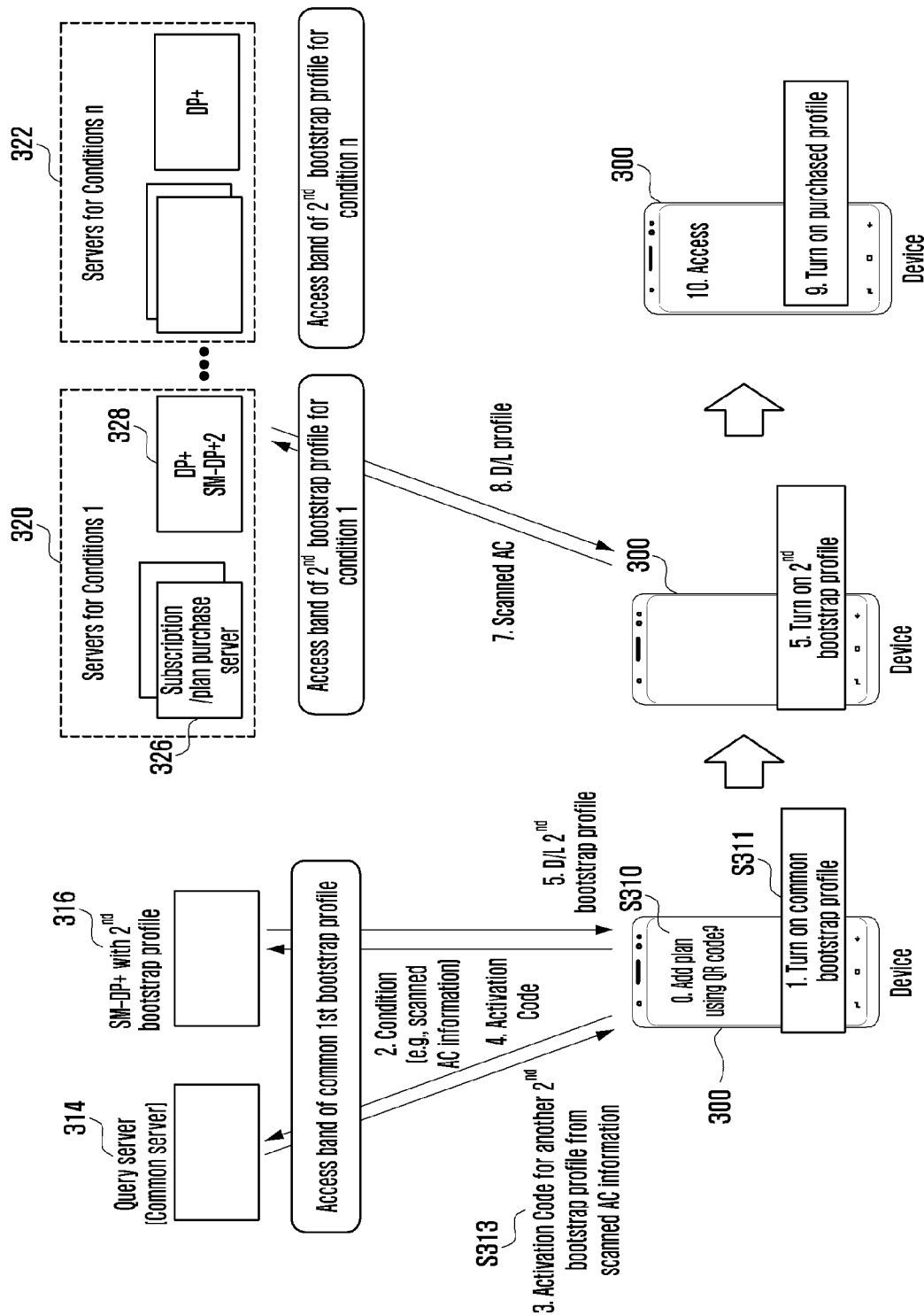
FIG. 3 is a diagram illustrating another operation example of a communication system to which an embodiment of the disclosure is applied.

FIG. 3 is a diagram illustrating another operation example of a communication system to which an embodiment of the disclosure is applied.

With reference to FIG. 3, a menu for installing a SIM profile by using a QR code may be displayed on a screen of a device 300 (S310). This menu may be displayed as any other text. For example, a menu to add a new plan by using a QR code may be displayed.

When the user selects the above menu and scans a QR code 304 by using a camera of the device 300, and the QR code 304 includes 0th activation code information, the device 300 may turn on a first bootstrap profile installed in the device 300 (311). To turn on a profile may be an operation of enabling the profile. The 0th activation code may include a server address of SM-DP+ 316 and AC_token information.

When the first bootstrap profile is turned on and the device 300 accesses the corresponding mobile network, the device 300 may transmit condition information of the device 300 to a query server 314 (312). For example, all or partial information of the 0th activation code included in the scanned QR code 304 may be transmitted.

Upon receiving the condition information from the device 300, the query server 314 may select a first activation code stored therein by referring to the condition information and provide it to the device 300 (313). At this time, the first activation code is information corresponding to a second bootstrap SIM profile, and the query server 314 selects the first activation code for downloading the second bootstrap SIM profile that is not currently installed in another device, and provides it to the device 300.

After receiving the first activation code, the device 300 performs mutual authentication with the first SM-DP+ 316 by using first SM-DP+ information included in the first activation code, and transmits an AC_token value included in the first activation code to the first SM-DP+ 316 (S314). Then the device downloads a second bootstrap profile from the first SM-DP+ 316 and installs it (S315). Thereafter, the device 300 may turn on the second bootstrap profile (S316). To turn on the profile may include a process of turning off the previously turned on profile. An operation of turning off the profile may be an operation of disabling the profile.

When the second bootstrap profile is turned on, the device 300 accesses a second SM-DP+ 328 by using the server address included in the 0th activation code included in the previously scanned QR code 304, performs mutual authentication, and transmits an AC_token value included in the 0th activation code to the second SM-DP+ 328 (S317). Then the device may download a user SIM profile from the second SM-DP+ 328 and install it in the device 300 (S318).

After the user SIM profile is installed, the device 300 may turn on the user SIM profile (319). The operation of turning on the user SIM profile may be performed automatically by the device 300 or performed when there is an explicit consent or selection of the user.

Upon accessing the mobile network by using the enabled user profile, the device 300 may display that the access is made (S320).

Figure 4:
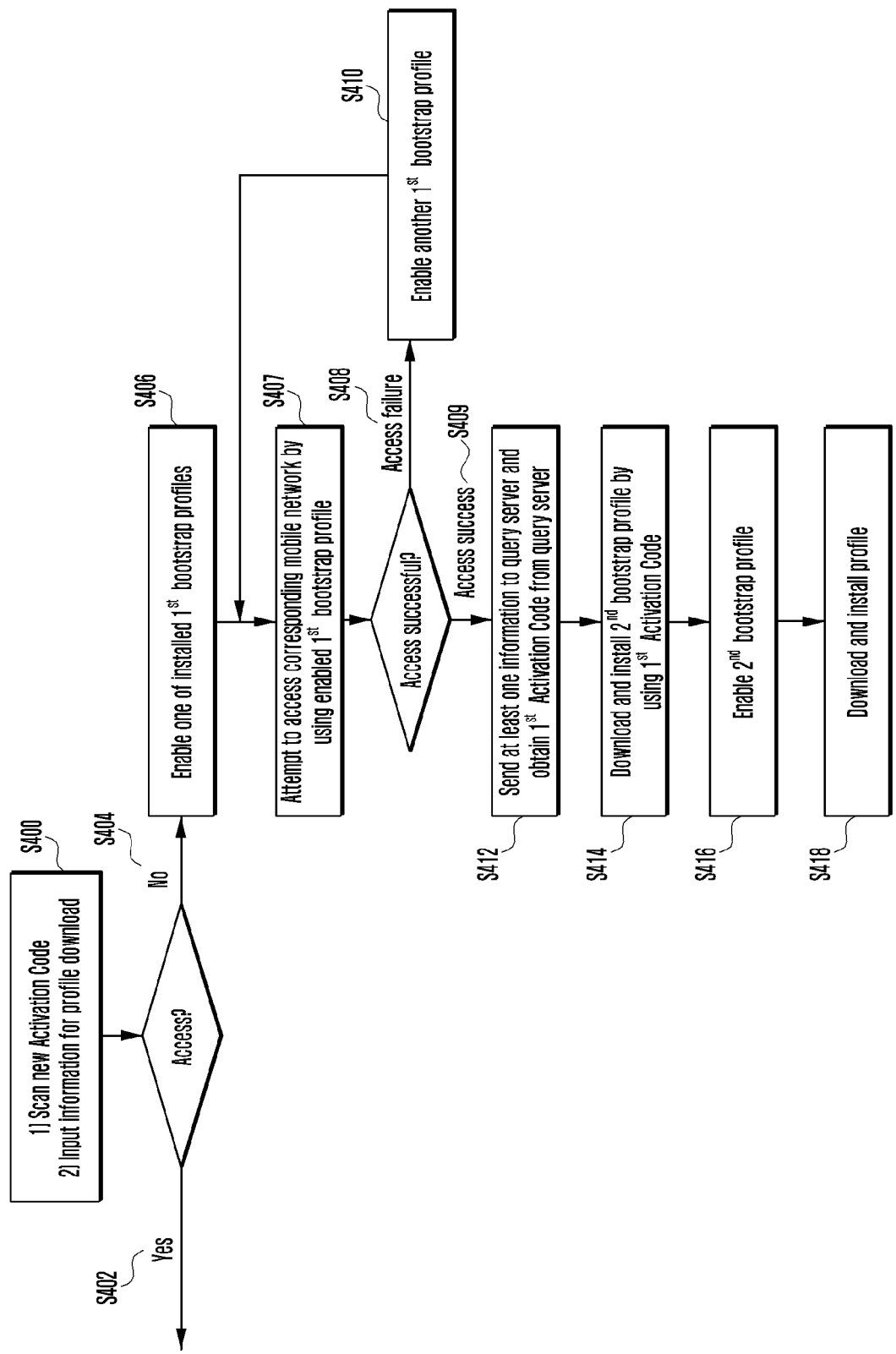
FIG. 4 is a diagram illustrating the operation of a device to which an embodiment of the disclosure is applied.

FIG. 4 is a diagram illustrating the operation of a device to which an embodiment of the disclosure is applied.

With reference to FIG. 4, the device allows the user to scan a new activation code (0th activation code) or input information for profile download (S400). The information for profile download may be information including a first SM-DP+ address.

If the device is connected to the Internet network through WiFi or the like (S402), it may receive a profile from the SM-DP+ by using corresponding information although not shown in the drawing. In case of failing to access the corresponding server (S404), the device may enable one of installed first bootstrap profiles (S406).

The device may attempt to access the corresponding mobile network by using the enabled first bootstrap profile (S407). If the access fails (S408), the device may enable another installed first bootstrap profile when it exists (S410), and try again to access the mobile network.

Although omitted from the figure, when it is possible to access the first SM-DP+ server corresponding to the 0th activation code or profile download information by using the first bootstrap profile, a user SIM profile may be downloaded and installed from the first SM-DP+.

When the device accesses the mobile network by using the first bootstrap profile (S409), the device may send to a query server the 0th activation code or the information required for profile download, obtained at the step S400, and/or information (e.g., one or more of the profile ID or MSISDN information) about the first bootstrap profile being used by the device, and then may obtain a first activation code from the query server (S412).

The device may download and install a second bootstrap profile by using the first activation code (S414), enable the corresponding profile (S416), and thereby access the corresponding mobile network. Then, using the 0th activation code or the information for profile download of the step S400, the device may download and install a profile from a second SM-DP+(S418).

Figure 5:
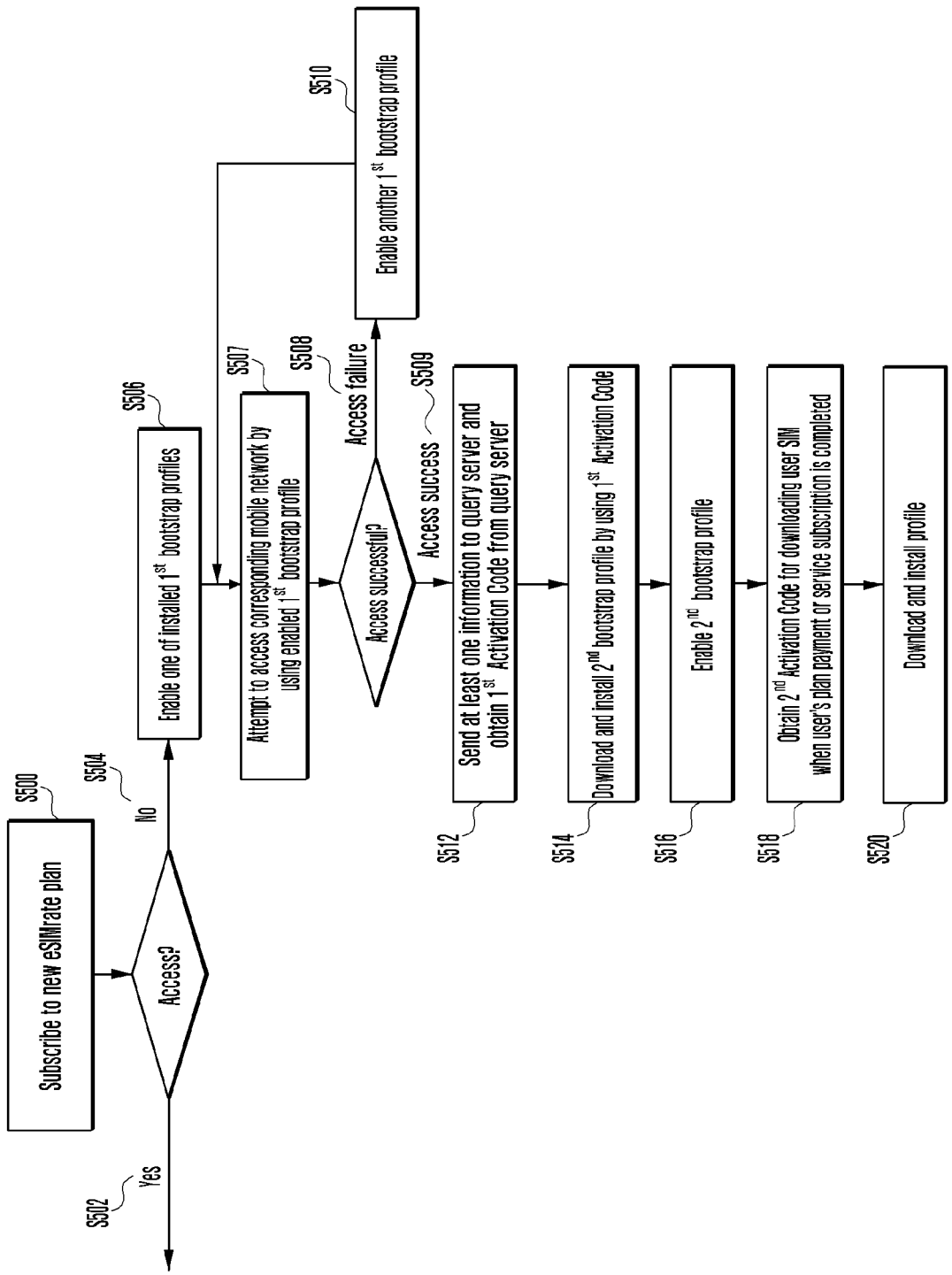
FIG. 5 is a diagram illustrating the operation of a device to which another embodiment of the disclosure is applied.

FIG. 5 is a diagram illustrating the operation of a device to which another embodiment of the disclosure is applied.

With reference to FIG. 5, the device allows the user to subscribe to a new eSIM rate plan or select an additional menu (S500). If the device is connected to the Internet network through WiFi or the like (S502), it may access a subscription server, subscribe or purchase a rate plan, and receive a profile from the SM-DP+ although not shown in the drawing.

If sufficient connectivity is not provided to the device (S504), the device may enable one of installed first bootstrap profiles (506). The device may attempt to access the corresponding mobile network by using the enabled first bootstrap profile (S507). If the access fails (S508), the device may enable another installed first bootstrap profile when it exists (S510), and try again to access the mobile network.

When the device accesses the mobile network by using the first bootstrap profile (S509), the device may request a second bootstrap profile from a query server and obtain a first activation code from the query server (S512). The device may download and install the second bootstrap profile by using the first activation code (S514), enable the corresponding profile (S516), and thereby access the corresponding mobile network. Then, the device may access a subscription/opening server, display a rate plan to the user, and when user's plan payment or service subscription is completed, obtain a second activation code for downloading a user SIM from the subscription/opening server (S518). Using the second activation code, the device may download and install a profile from a second SM-DP+(S520).

Figure 6:
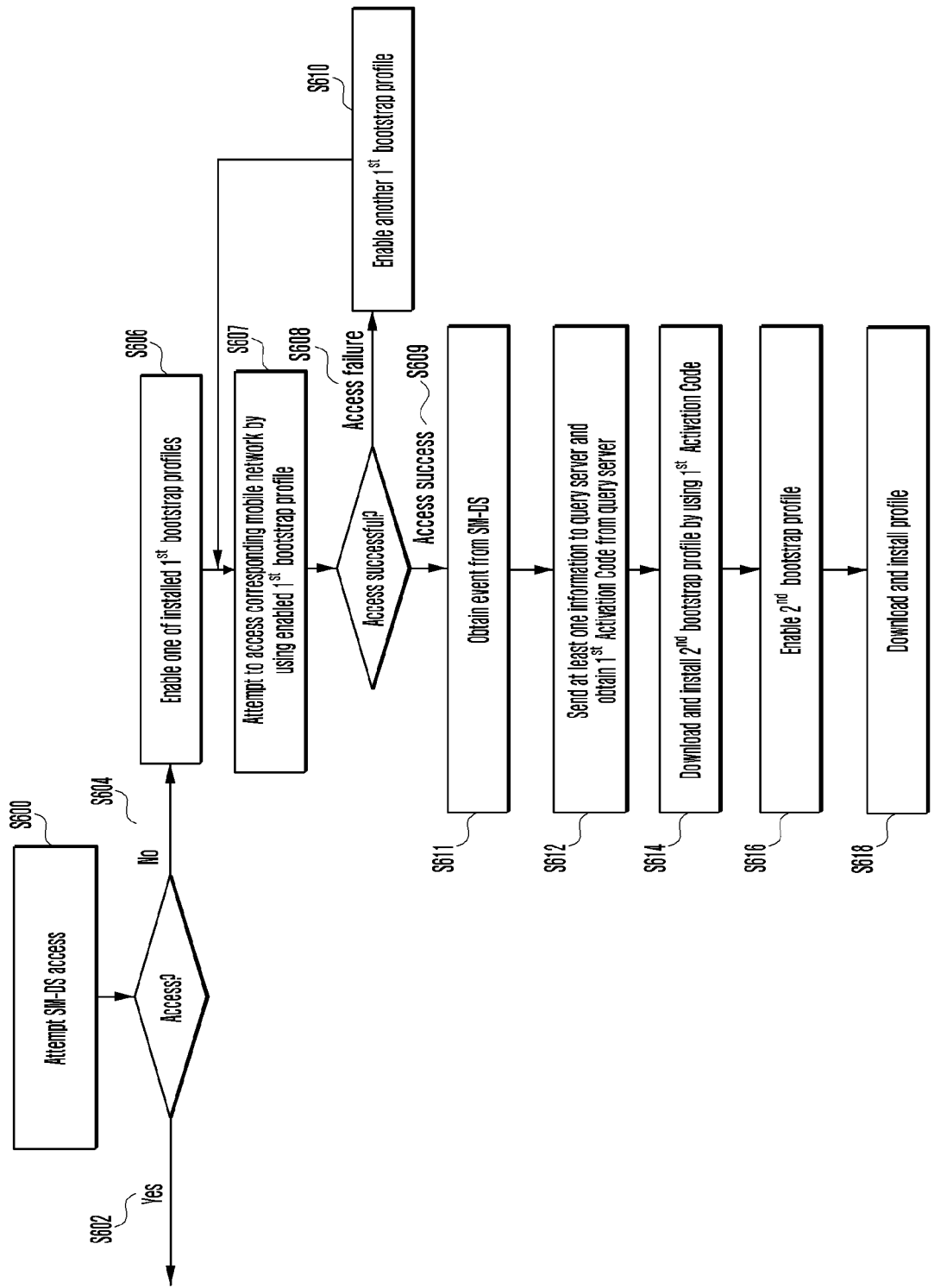
FIG. 6 is a diagram illustrating the operation of a device to which still another embodiment of the disclosure is applied.

FIG. 6 is a diagram illustrating the operation of a device to which still another embodiment of the disclosure is applied.

With reference to FIG. 6, the device may attempt an SM-DS access (S606). This access attempt may be performed when the user selects a menu such as adding a rate plan, adding a profile, or adding an eSIM. If the device is connected to the Internet network through WiFi or the like (S602), it may receive information, i.e., event, for profile download from the SM-DS by using corresponding information and then download a profile from SM-DP+ by using the received event although not shown in the drawing.

If the connectivity of the device is insufficient (S604), the device may enable one of installed first bootstrap profiles (S606). The device may attempt to access the corresponding mobile network by using the enabled first bootstrap profile (S607). If the access fails (S608), the device may enable another installed first bootstrap profile when it exists (S610), and try again to access the mobile network.

When the device accesses the mobile network by using the first bootstrap profile (S609), the device may obtain the event from the SM-DS (S611).

The device may send to a query server all or partial information of the event and/or information (e.g., one or more of the profile ID or MSISDN information) about the first bootstrap profile being used by the device, and then may obtain a first activation code from the query server (612). The device may download and install a second bootstrap profile by using the first activation code (S614), enable the corresponding profile (S616), and thereby access the corresponding mobile network. Then, using an event ID and a server address of second SM-DP+ included in the event obtained at the step S611, the device may download and install a profile from the second SM-DP+(S618).

With reference to FIGS. 1 to 6, in order to download the user SIM profile, the device downloads and installs, first of all, the second bootstrap profile that allows access to the second SM-DP+ from which the user SIM profile can be downloaded. After that, using the installed second bootstrap profile, the device downloads the user SIM profile. The download of the second bootstrap profile uses the first bootstrap profile pre-installed in the device. The same first bootstrap profile may be used for several devices. In this case, the advantage is that there is no need to pre-allocate number resources such as IMSI and MSISDN for each device, and thus cost can be reduced. When the first bootstrap profile is commonly used for several devices, simultaneous access may be limited. In order to solve this problem, the time during which each device enables and uses the first bootstrap profile can be adjusted. Such methods may be as follows.

1. The device controls the time of the enabled state of the first bootstrap profile to be within a specific time. For example, in the embodiments of FIGS. 1 to 6, it is sufficient for the first bootstrap profile be enabled only while the device accesses the query server to obtain information about the second bootstrap profile and downloads and installs the second bootstrap profile from the first SM-DP+. Therefore, the maximum enabled time of the first bootstrap profile can be controlled to fall within a specific time. For example, this specific time may be set to one minute. Because of enabling the first bootstrap profile only under a specific condition (i.e., a situation where the SIM profile needs to be downloaded), the above time limit can lower the probability that a plurality of devices access the mobile network through the same first bootstrap profile.

2. In case of receiving the second bootstrap profile by using the first bootstrap profile, the device immediately disables the first bootstrap profile. This method may be used complementary to the above method 1.

3. In the authentication system of the mobile network accessed with the first bootstrap profile, the access maintenance time of the first bootstrap profile may be controlled within a specific time to block the access. For example, this specific time may be set to ten minutes. In addition, if there is no separate user input, the device may not attempt automatic re-access.

Even if the first bootstrap profile is shared among devices, the possibility of simultaneous access attempts can be reduced through the above methods. However, when the number of sharing devices increases, simultaneous access attempts of a plurality of devices using the specific first bootstrap profile increase, and a certain device cannot access the mobile network through the first bootstrap profile. For this reason, the device may install a plurality of first bootstrap profiles. The plurality means that the respective first bootstrap profiles have different IMSI and MSIDSN values. If there are the plurality of first bootstrap profiles, and even if the mobile network access using one of the first bootstrap profiles fails, access may be attempted by enabling another first bootstrap profile as in the embodiments of FIGS. 1 to 6.

Meanwhile, in the embodiments of FIGS. 1 to 6, it is preferable that the second bootstrap profile downloaded to download the user SIM profile to a specific device can be used again in another device after use. For this purpose, the device may delete the second bootstrap profile after downloading and installing the user SIM profile. In addition, the device may generate profile deletion evidence information and transmit it to one or more servers of the second SM-DP+ and the query server so that the second bootstrap profile can be reused in that device or another device.

The profile deletion evidence information may be delete notification information and may be information that contains at least one of a device or eUICC signature, a separator indicating deletion, an ID of a profile, and sequence information capable of verifying the freshness of information. Specifically, when the device downloads the user SIM profile by using the second bootstrap profile and completes installation, the device may perform the following operations.

a. Disable the second bootstrap profile
   b. Delete the second bootstrap profile
   c. Enable the user SIM profile
   d. Transmit deletion evidence information of the second bootstrap profile
   e. Delete the deletion evidence information of the second bootstrap profile The above operation 'c' may be performed before the operation 'b'. The above operations 'd' and 'e' may be performed later.

Also, if a certain time (e.g., ten minutes) elapses without downloading and installing the user SIM profile after the device enables the second bootstrap profile, the device may delete the second bootstrap profile so that the same device or another device can use the second bootstrap profile later. Specifically, when a specific time elapses after the second bootstrap profile is enabled, the device may automatically perform the following operations.

a. Disable the second bootstrap profile
   b. Delete the second bootstrap profile
   c. Enable the first bootstrap profile
   d. Transmit deletion evidence information of the second bootstrap profile
   e. Delete the deletion evidence information of the second bootstrap profile
   f. Disable the first bootstrap profile The above operation 'c' may be performed before the operation 'b'. The above operations 'd' and 'e' may be performed later.

Figure 7A:
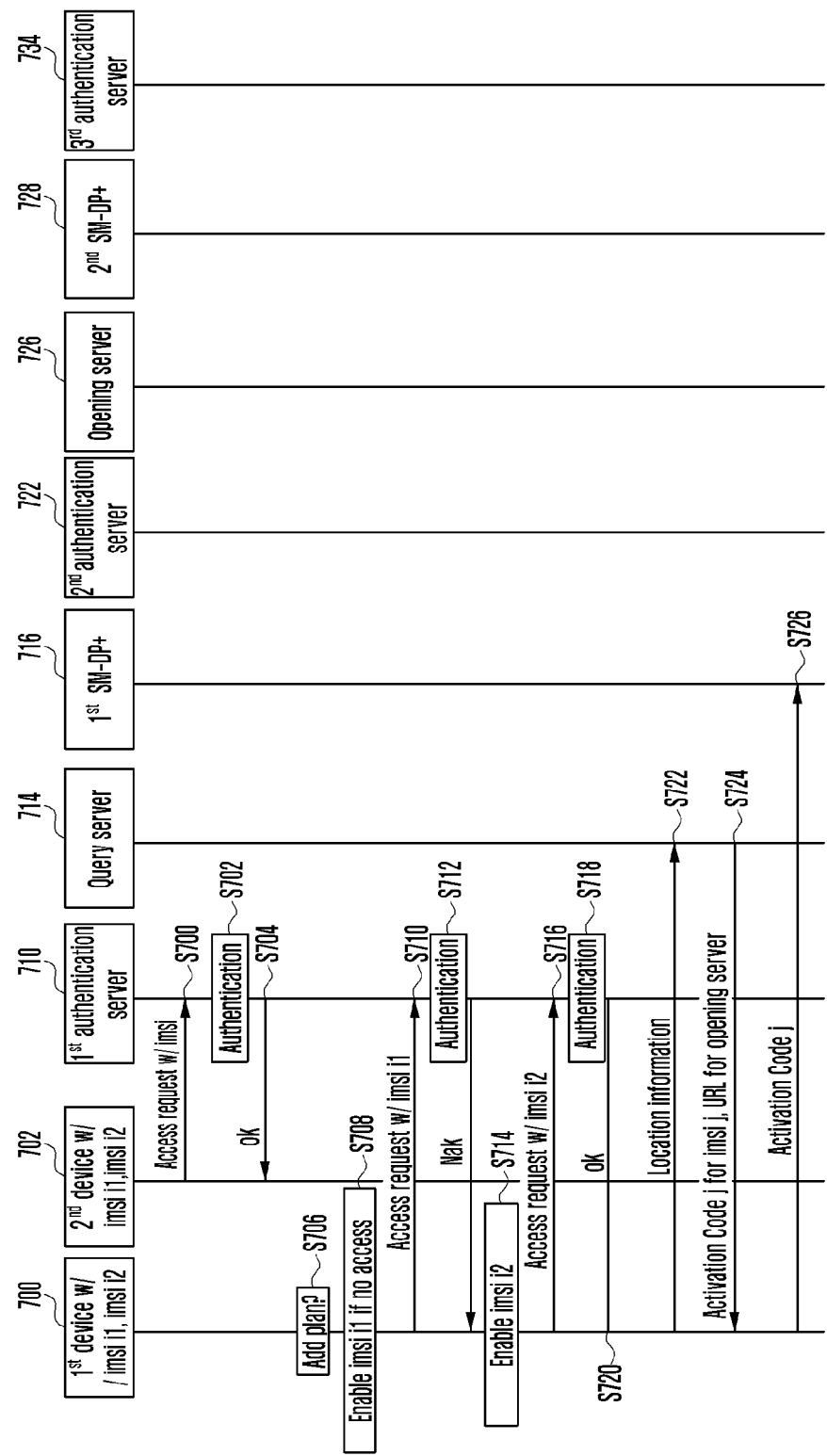
FIGS. 7A and 7B are diagrams illustrating the operation of a communication system to which an embodiment of the disclosure is applied.
Figure 7B:
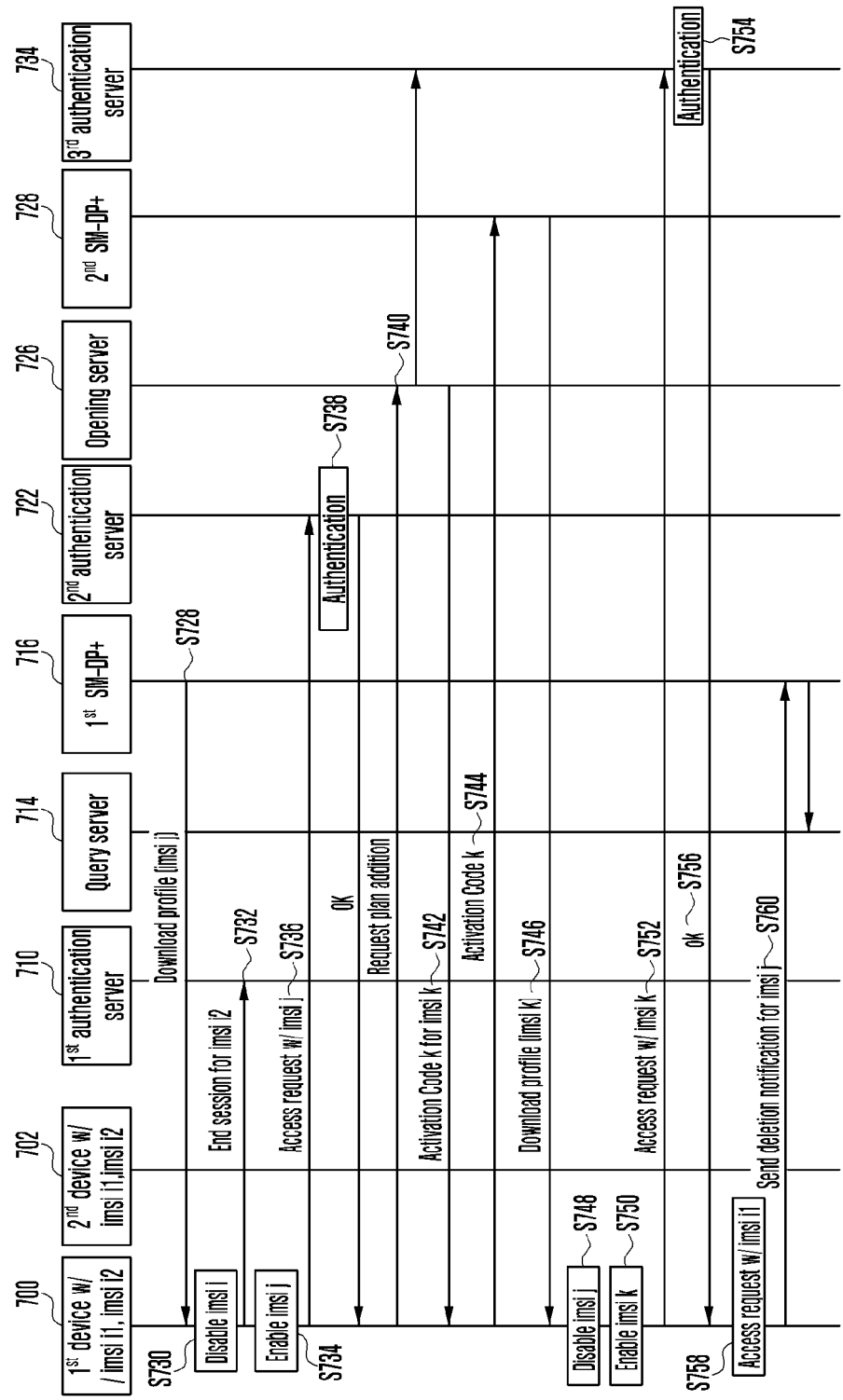

FIGS. 7A and 7B are diagrams illustrating the operation of a communication system to which an embodiment of the disclosure is applied.

With reference to FIGS. 7A and 7B, the operations illustrated in FIGS. 7A and 7B are roughly similar to those of FIGS. 1, 2, and 5. However, in FIGS. 7A and 7B, a method for additionally utilizing the first bootstrap and a processing method after using the second bootstrap profile in case that the device has a plurality of first bootstrap profiles will be described in detail.

As shown in FIGS. 7A and 7B, there may be two or more devices (e.g., a first device 700 and a second device 702) sharing the same first bootstrap profile (imsi i1) in a communication system.

At the outset, the second device 702 may send an authentication request to a first authentication server 710 of a first mobile network by using the first bootstrap profile (imsi i1) (S700). The first authentication server 710 may perform mutual authentication with the second device (S702) and then send an access permission to the second device (S704).

Thereafter, when the user wants to add a new plan or profile in the first device 700 (S706), the first device may enable one (imsi i1) of first bootstrap profiles (S708). When the first device 700 requests an access to the first authentication server 710 of the first mobile network by using the first bootstrap profile (imsi i1) (S710), the first authentication server 710 performs mutual authentication and may reject the access if another device is already accessing with the same profile (S714). Then the first device 700 may disable the enabled first bootstrap profile (imsi i1) and enable another first bootstrap profile (imsi i2) (S716).

When the first device 700 enables another first bootstrap profile (imsi i2) and requests an access to a mobile operator corresponding to that profile (S718), the authentication server 710 of the mobile network performs authentication (S720) and may transmit an access permission message to the first device if any other device is not using the corresponding profile (imsi i2) (S722).

For convenience of explanation, the authentication server of the mobile network operator of one first bootstrap profile (imsi i1) and the authentication server of the mobile network operator of another first bootstrap profile (imsi i2) are depicted as the same server in FIGS. 7A and 7B, but such authentication servers may be different authentication servers.

When the first device 700 succeeds in accessing the mobile network through the first bootstrap profile, it may transmit a query condition to a query server 714 (S724). The query condition may include at least one information of location information, a specific operator or operator group, a profile ID, an MNO ID, a PLMN ID, an activation code, an SM-DP+ server address, device model information, and an eUICC ID.

The query server 714 may select an available second bootstrap profile by using at least one information of the query condition and provide at least one information of a first activation code, an SM-DP+ server address, a SM-DS server address, and an URL address of a subscription/opening server, which will be used to receive one second bootstrap profile, to the first device (S726).

Hereinafter, a subsequent procedure when the first device 700 receives the first activation code will be described without obscuring the subject matter of the disclosure.

Using the received first activation code and the SM-DP+ address included in the activation code, the first device 700 may transmit the information included in the first activation code to the corresponding SM-DP+ 716 (S728). Then the first device may receive a second bootstrap profile from the SM-DP+ 716 (S730). The transmitted information of the first activation code may be information transmitted together with a signature of an eUICC connected to the device after the eUICC verifies a server signature of the SM-DP+ received from the SM-DP+.

After downloading and installing the second bootstrap profile, the first device 700 may disable the first profile (S732) and enable the second bootstrap profile (736). When the first device 700 accesses the mobile network by using the second bootstrap profile (738 to 742), the first device 700 may access the subscription/opening server URL address previously received or set in advance in the device to purchase or subscribe to a rate plan, a service plan, or a prepaid SIM profile (S744) and, as a result, receive a second activation code (746).

The subscription/opening server may prepare the download of the profile corresponding to that activation code and deliver service activation or purchase completion information of the corresponding profile to a server of the mobile network. Such information may be delivered in advance to activate the service of the corresponding profile. The first device may download and install the user SIM profile from the second SM-DP+ by using the second activation code (S750). Then the first device may disable the second bootstrap profile, enable the user SIM profile, and access the mobile network (S752 to S758). The first device may delete the second bootstrap profile from the eUICC when the user SIM profile is successfully installed (760), and transmit deletion evidence information to one or more of the first SM-DP+ and the query server (S762). The query server may receive the deletion evidence information of the corresponding profile or the corresponding profile ID from the first device, the first SM-DP+, or a server of a second mobile network operator, confirms that the corresponding second bootstrap profile has been deleted, and provide later the activation code for the corresponding profile to the first device or another device.

Figure 8:
FIG. 8 is a diagram illustrating the structure of a terminal according to an embodiment of the disclosure.

FIG. 8 is a diagram illustrating the structure of a terminal according to an embodiment of the disclosure.

With reference to FIG. 8, the terminal may include a transceiver 810, a controller 820, and a storage 830. In the disclosure, the controller may be defined as a circuit, an application-specific integrated circuit, or at least one processor.

The transceiver 810 may transmit/receive a signal to/from another network entity. For example, the transceiver 810 may receive system information from a base station and receive a synchronization signal or a reference signal.

The controller 820 may control the overall operation of the terminal according to the embodiments proposed in the disclosure. For example, the controller 820 may control a signal flow between blocks to perform the operations according to the above-described flow diagrams. Specifically, the controller 820 may control the operations proposed in the disclosure to receive remaining minimum system information (RMSI) in a multi-beam based system according to an embodiment of the disclosure.

The storage 830 may store information transmitted/received through the transceiver 810 and/or information generated through the controller 820.

In the above-discussed embodiments of the disclosure, elements included in the disclosure are expressed as a singular or plural form depending on the discussed specific embodiments. However, it is to be understood that such singular or plural representations are selected appropriately according to situations presented for the convenience of description, and the disclosure is not limited to the singular or plural form. Even expressed in a singular form, an element may be construed as a plurality of elements, and vice versa.

Meanwhile, embodiments of the disclosure and the accompanying drawings are only examples presented in order to easily describe the disclosure and facilitate comprehension of the disclosure, but are not intended to limit the scope of the disclosure. Therefore, the scope of the disclosure should be construed as including all changes or modifications derived from the technical contents of the disclosure in addition to the embodiments disclosed herein.

The invention claimed is:

1. A method for receiving a profile for a communication service at a terminal in a wireless communication system, the method comprising:
   receiving, from a query server, first download information for receiving a second bootstrap profile by using a first bootstrap profile that is one of a plurality of bootstrap profiles installed in the terminal;
   downloading the second bootstrap profile from a first profile server by using the first download information and installing the second bootstrap profile in the terminal;
   installing a user profile in the terminal, based on the second bootstrap profile and a user selection, and accessing a mobile network by using the user profile;
   accessing a purchase server by executing the second bootstrap profile;
   determining the user profile, based on information on a communication service provided by the purchase server;
   receiving, from the purchase server, second download information for receiving the user profile; and
   downloading the user profile from a second profile server by using the second download information and installing the user profile in the terminal.

2. The method of claim 1, further comprising:
   disabling and deleting the second bootstrap profile after installing the user profile;
   enabling the user profile; and
   transmitting information indicating deletion of the second bootstrap profile.

3. The method of claim 1, further comprising:
   when a predetermined time elapses after the second bootstrap profile is enabled, disabling and deleting the second bootstrap profile;
   enabling the first bootstrap profile;
   transmitting information indicating deletion of the second bootstrap profile; and
   disabling the first bootstrap profile.

4. The method of claim 1, further comprising:
   executing the first bootstrap profile, based on a user selection for rate plan information displayed in the terminal; or
   executing the first bootstrap profile by scanning a quick response (QR) code.

5. The method of claim 1, further comprising:
   transmitting, to the query server, location information on the terminal,
   wherein the first download information is determined, based on the location information.

6. The method of claim 1, further comprising:
performing mutual authentication with the first profile server, based on authentication information included in the first download information.

7. The method of claim 1, further comprising:
accessing the second profile server, based on address information included in the second download information; and
performing mutual authentication with the second profile server,
wherein access information on the purchase server is previously set in the terminal, included in the first download information, or included in metadata information on the installed second bootstrap profile.

8. A terminal for receiving a profile for a communication service in a wireless communication system, the terminal comprising:
a transceiver; and
a controller connected to and controlling the transceiver, and configured to:
receive, from a query server, first download information for receiving a second bootstrap profile by using a first bootstrap profile that is one of a plurality of bootstrap profiles installed in the terminal, to download the second bootstrap profile from a first profile server by using the first download information,
install the second bootstrap profile in the terminal, to install a user profile in the terminal, based on the second bootstrap profile and a user selection, and to access a mobile network by using the user profile,
access a purchase server by executing the second bootstrap profile,
determine the user profile, based on information on a communication service provided by the purchase server,
receive, from the purchase server, second download information for receiving the user profile,
download the user profile from a second profile server by using the second download information and install the user profile in the terminal,
disable and delete the second bootstrap profile after installing the user profile,
enable the user profile, and
transmit information indicating deletion of the second bootstrap profile.

9. The terminal of claim 8, wherein the controller is configured to:
when a predetermined time elapses after the second bootstrap profile is enabled, disable and delete the second bootstrap profile,
enable the first bootstrap profile,
transmit information indicating deletion of the second bootstrap profile, and
disable the first bootstrap profile.

10. The terminal of claim 8, wherein the controller is configured to:
execute the first bootstrap profile, based on a user selection for rate plan information displayed in the terminal, or
execute the first bootstrap profile by scanning a quick response (QR) code.

11. The terminal of claim 8, wherein the controller is configured to:
transmit, to the query server, location information on the terminal, wherein the first download information is determined, based on the location information.

12. The terminal of claim 8, wherein the controller is configured to:
perform mutual authentication with the first profile server, based on authentication information included in the first download information.

13. The terminal of claim 8, wherein the controller is configured to:
access the second profile server, based on address information included in the second download information, and
perform mutual authentication with the second profile server, and
wherein access information on the purchase server is previously set in the terminal, included in the first download information, or included in metadata information on the installed second bootstrap profile.

* * * * *